US008498826B2

(12) United States Patent
Nagathil et al.

(10) Patent No.: US 8,498,826 B2
(45) Date of Patent: Jul. 30, 2013

(54) METHOD AND SYSTEM FOR MACHINE CONDITION MONITORING

(75) Inventors: Roopesh Bhaskaran Nagathil, Atlanta, GA (US); Mills Thomas Robinson, Jr., Norfolk, VA (US)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 12/956,311

(22) Filed: Nov. 30, 2010

(65) Prior Publication Data

US 2012/0136587 A1 May 31, 2012

(51) Int. Cl.
*G06F 19/00* (2011.01)
(52) U.S. Cl.
USPC .............. 702/34; 702/181; 702/182; 702/183; 706/20; 706/912; 318/490
(58) Field of Classification Search
USPC ........ 702/34, 181, 182, 183, 56, 54; 340/635, 340/648, 679, 682, 683, 680; 706/20, 912; 318/490, 806; 700/286
See application file for complete search history.

(56) References Cited

U.S. PATENT DOCUMENTS

| | | | |
|---|---|---|---|
| 5,019,760 A | | 5/1991 | Chu et al. |
| 5,726,911 A | | 3/1998 | Canada et al. |
| 5,852,351 A | * | 12/1998 | Canada et al. ................ 318/490 |
| 6,199,018 B1 | * | 3/2001 | Quist et al. ..................... 702/34 |
| 6,297,742 B1 | * | 10/2001 | Canada et al. ................ 340/635 |
| 6,308,140 B1 | | 10/2001 | Dowling et al. |
| 6,529,135 B1 | * | 3/2003 | Bowers et al. ................ 340/648 |
| 6,834,256 B2 | | 12/2004 | House et al. |
| 7,305,330 B2 | | 12/2007 | Urakami et al. |
| 7,457,785 B1 | | 11/2008 | Greitzer et al. |
| 2004/0138832 A1 | * | 7/2004 | Judd ............................. 702/56 |
| 2005/0033557 A1 | | 2/2005 | House et al. |
| 2008/0048603 A1 | | 2/2008 | Discenzo |
| 2008/0216576 A1 | | 9/2008 | Eckert et al. |
| 2009/0096405 A1 | | 4/2009 | Flickinger et al. |
| 2010/0047089 A1 | | 2/2010 | Booker et al. |

OTHER PUBLICATIONS

Search Report and Written Opinion from EP Application No. 11190193.0 dated May 4, 2012.

* cited by examiner

*Primary Examiner* — Carol Tsai
(74) *Attorney, Agent, or Firm* — Global Patent Operation

(57) ABSTRACT

A method and system for monitoring a condition of a machine are provided. The machine monitoring system includes a housing mounted to a surface of a machine, a plurality of sensors configured to generate respective output signals for a parameter indicative of a condition of the machine, and a voting module positioned within the housing and configured to generate a corrected output based on the respective output signals. The machine monitoring system also includes a memory device including a store location configured to store manual input functions relating to a construction of the machine, a life calculator communicatively coupled to the voting module and the memory device wherein the life calculator is configured to determine a life remaining in the machine using the corrected output and the manual input functions, and a display positioned within the housing and configured to display the life remaining in the machine.

19 Claims, 2 Drawing Sheets

METHOD AND SYSTEM FOR MACHINE CONDITION MONITORING

BACKGROUND OF THE INVENTION

The field of the invention relates generally to machine condition monitoring, and more specifically, to a method and system for near real-time monitoring a remaining life of a machine using a monitored condition of the machine.

In at least some known industries, such as, but not limited to, the oil, gas, and electric utility industries, during peak demand periods it is essential for critical equipment to perform at their maximum capacity to reap the benefits of the given market conditions, for example, a period where the price of crude oil per barrel and/or the price of electricity per KWhr is relatively high.

Based on data available, one of the top causes of equipment un-availability is down time due to scheduled maintenance. Often, such maintenance is not required by a condition of the equipment, but is rather specified by a time requirement. By driving towards condition-based maintenance, non-value added inspections and maintenance can be reduced if not eliminated.

Currently, little information is available to the plant engineer on the amount of degradation of equipment prior to the inspection and there is no room for extending life. Using a fixed interval inspection schedule, information related to the life degradation is available only after an inspection is performed. Any benefits of life improvement are seen only after the next inspection is performed. There is no indication of drastic changes to the life between the two inspections should they occur. The cycle time to identify the remaining life and to mitigate the risk is very high. It is difficult to identify the most degraded machine or the machine that needs immediate attention. Moreover, the effects of intermittent maintenance actions such as filter cleaning; lubrication etc cannot be identified or tracked till next inspection.

BRIEF DESCRIPTION OF THE INVENTION

In one embodiment, a machine monitoring system includes a housing mounted to a surface of a machine, a plurality of sensors configured to monitor a parameter of the machine and generate respective output signals, the parameter indicative of a condition of the machine, and a voting module positioned within the housing and configured to receive the respective output signals and generate a corrected output based on the respective output signals. The machine monitoring system also includes a memory device positioned within the housing and including a store location configured to store manual input functions relating to a construction of the machine, a life calculator positioned within the housing and communicatively coupled to the voting module and the memory device wherein the life calculator is configured to determine a life remaining in the machine using the corrected output and the manual input functions, and a display positioned within the housing and configured to display the life remaining in the machine.

In another embodiment, a method of monitoring a condition of a machine includes receiving a plurality of sensor outputs at a machine condition monitoring device mounted on the machine being monitored, the sensor outputs related to parameters of the machine that are relatable to a life of at least one component of the machine and receiving from a stored location in the machine condition monitoring device input functions that have been manually stored in the stored location, the input functions relating to a construction of the machine. The method further includes periodically determining a life left in the machine using the received plurality of sensor outputs and the received input functions by a life calculator positioned within the machine condition monitoring device, and displaying on the machine condition monitoring device an amount of the determined life left in the machine.

In yet another embodiment, an electrical machine system includes an electrical winding, a temperature sensor positioned proximate the electrical winding, and a machine monitoring system coupled to the electrical machine and communicatively coupled to the temperature sensor, the machine monitoring system including a processor having a memory. The processor is programmed to receive a signal from the temperature sensor relative to a temperature of the electrical winding, receive information relative to a construction of the electrical machine from the memory, determine a remaining life of the machine using the received signal and the received information, and display the remaining life on the machine monitoring system.

BRIEF DESCRIPTION OF THE DRAWINGS

FIG. 1 is a schematic block diagram of a machine monitoring system in accordance with an exemplary embodiment of the present invention; and FIG. 2 is a data flow block diagram of the machine monitoring system shown in FIG. 1.

DETAILED DESCRIPTION OF THE INVENTION

The following detailed description illustrates embodiments of the invention by way of example and not by way of limitation. It is contemplated that the invention has general application to analytical and methodical embodiments of monitoring machine life remaining in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention include a life calculator mounted on a machine that provides a user with an indication of remaining life of a machine component, such as, but not limited to, the motor stator winding. This calculator can be used for all type of heavy-duty motors and all class of winding insulation. The output from this calculator can be used to schedule maintenance in a pro-active manner driving towards condition based monitoring. Approximately 60% of a motor cost can be attributed to the windings. A key factor that determines motor winding life is operating temperature and in most cases when the operating temperature is much below the insulation class operating temperature rating, additional life can be added, extending the time to a maintenance outage. Relatively new high speed computing using a microprocessor-based onboard device that includes a capability of being programmed, data storage and a display is used to perform the calculation, store and display the data.

Some of the key issues that are resolved using embodiments of the present invention include: increasing the condition information available between inspections, realizing the benefits early, minimizing equipment losses by early detection, reducing maintenance cycle time, driving condition-based improvements, and forecasting/prioritizing future maintenance events.

Plant sites with major risk potential are identified and limited resources directed to maximize the operational benefits. By continuously tracking the changes in the machine life remaining, the plant operator forecasts the potential risks involved for a particular site and prioritizes appropriate actions.

Figure 1:
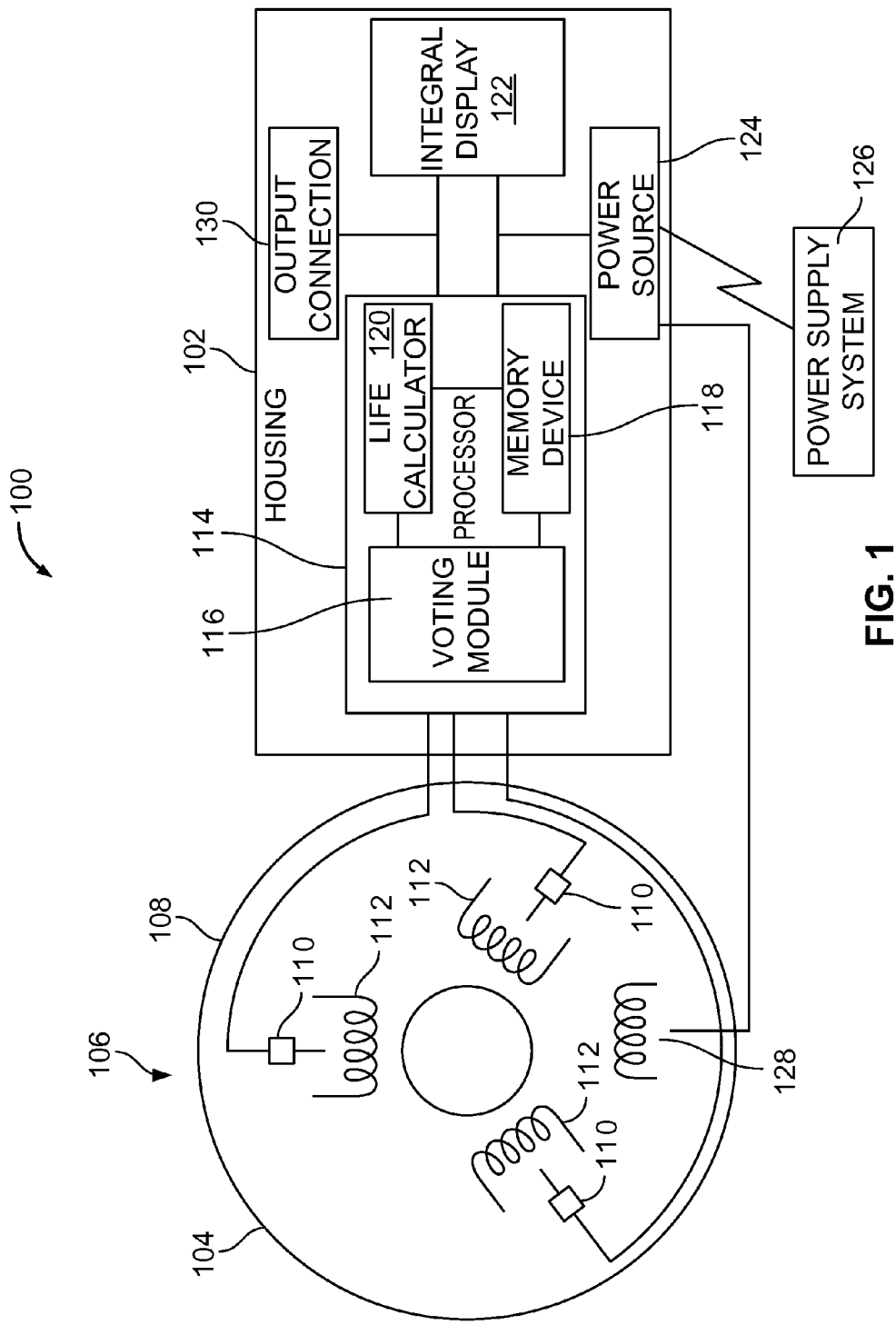
FIGS. 1-2 show exemplary embodiments of the method and system described herein.

FIG. 1 is a schematic block diagram of a machine monitoring system 100 in accordance with an exemplary embodiment of the present invention. In the exemplary embodiment, machine monitoring system 100 includes a housing 102 coupled to a casing 104 of a machine 106, such as, but not limited to, an electric motor. In the exemplary embodiment, machine monitoring system 100 is coupled to a radially outer peripheral surface 108 of casing 104. In various other embodiments, machine monitoring system 100 is mounted in a single enclosure to machine 106. Machine monitoring system 100 also includes one or more sensors 110 configured to monitor a parameter of machine 106 that is indicative of a condition and/or life remaining of machine 106. In the exemplary embodiment, sensors 110 comprise temperature sensors positioned proximate respective motor windings 112. In the exemplary embodiment, windings 112 are spaced approximately 120° apart circumferentially about machine 106 and consequently sensors 110 are also spaced approximately 120° apart circumferentially about machine 106. Sensors 110 are communicatively coupled to machine monitoring system 100 using respective conduits or wirelessly. Signals relative to a condition of machine 106 are received at machine monitoring system 100 by a processor 114 that includes a voting module 116, a memory device 118, and a life calculator 120.

Voting module 116 may be embodied in hardware as part of processor 114 or software executing on processor 114 and is configured to receive the respective output signals and generate a corrected output based on the respective output signals determined to be not failed. In one embodiment, voting module 116 uses a simple voting technique to discard signals deemed to be outliers compared to the other signals being received from sensors 110. In various other embodiments, sophisticated sensor health algorithms are used to determine a health of sensors 110 to validate input data to processor 114.

Memory device 118 comprises a store location configured to store manual input functions relating to a construction of the machine. Such manual input functions include information relating to materials, electrical properties, rotational speed, cooling system capability, electrical parameters, such as, but not limited to, rotor current, stator current, airgap size, and flux density.

Life calculator 120 may be embodied in hardware as part of processor 114 or software executing on processor 114 and is communicatively coupled to voting module 116 and memory device 118. Life calculator 120 is configured to determine a life remaining in machine 106 using the corrected output signals and the manual input functions. Life calculator 120 is also configured to determine a percentile value for the generated respective output signals or to determine a percentile value for an average of the generated respective output signals over a predetermined time. Life calculator 120 is configured to determine a remaining life output using a percentile value for an average of the generated respective output signals over a predetermined time. In various embodiments, life calculator 120 is configured to determine that the respective output signals from sensors 110 or the corrected output from voting module 116 exceed a predetermined threshold range and generate an output indicative of the exceedance. Moreover, life calculator 120 is configured to store calculated outputs onboard machine monitoring system 100 for a future output to an off board system or to display 122.

In the exemplary embodiment, machine monitoring system 100 also includes an integral display 122 visible from outside of machine monitoring system 100. In various embodiments, display 122 may be internal to machine monitoring system 100 under a removable cover or otherwise protected from an environment external to machine monitoring system 100.

Power for the operation of machine monitoring system 100 may be supplied by a replaceable and/or rechargeable power source 124 such as, but not limited to, a battery or capacitor. Power source 124 may also be embodied in a wireless power supply system 126 or transformer system 128 configured to receive power through magnetic interaction with windings 112.

Machine monitoring system 100 also includes an output connection 130 communicatively coupled to processor 114.

Figure 2:
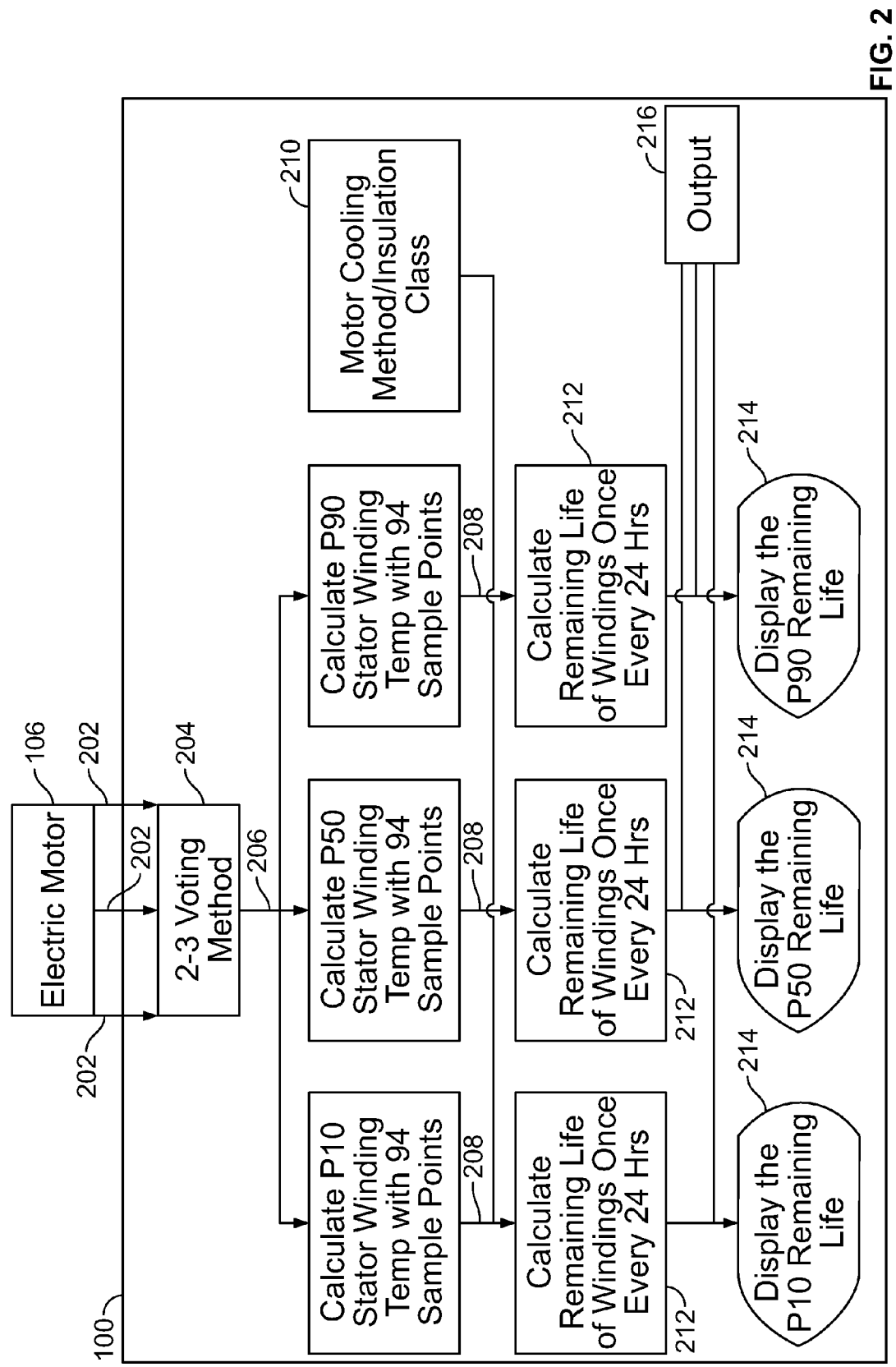

FIG. 2 is a data flow block diagram of machine monitoring system 100 (shown in FIG. 1). In the exemplary embodiment, machine monitoring system 100 receives output signals 202 from a plurality of sensors positioned to monitor one or more operating parameters of machine 106. The operating parameters are selected such that a remaining life of machine 106 may be determined from analyzing the output signals 202. Output signals 202 are validated 204 using a voting method in the exemplary embodiment. A simple two-out-of three voting method may be used to select the best two-out-of three signals 202 to be used in further processing. If one of the sensors fails, the other two sensors provide an uninterrupted validated or corrected output signal 206. Corrected output signal 206 is used to generate percentile based parameter outputs 208, which are combined with manual input functions 210 including machine information relating to materials of construction, electrical properties, rotational speed, cooling system capability, electrical parameters, such as, but not limited to, rotor current, stator current, airgap size, and flux density to determine 212 a remaining life in the component being monitored, in this example the stator windings of an electrical machine. Other parameters may be used to determine a life of other components, for example, vibration parameters may be used to determine a remaining life of machine bearings. Manual input functions 210 typically are entered into machine monitoring system 100 when machine 106 is brand new and when refurbished when such refurbishment modifies any of the functions described by manual input functions 210. The determined remaining life is displayed 214 on machine monitoring system 100 or may be stored onboard machine monitoring system 100 for later output 216 to a maintenance management system (not shown).

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 114, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is locally monitoring operating data from an individual machine on a near real-time basis and calculating the remaining life of a component of the machine or a composite remaining life of the entire machine wherein the remaining life can be viewed using a digital display at the machine. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of periodically determining a life left in a machine using received sensor outputs and received input functions provides a cost-effective and reliable means for monitoring a condition of a machine. More specifically, the methods and systems described herein facilitate data collection and calculations conducted locally on the machine. As a result, the methods and systems described herein facilitate early detection and timely scheduling of planned maintenance in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A machine monitoring system comprising:
    a housing mounted to a surface of a machine;
    a plurality of sensors configured to monitor a parameter of the machine and generate respective output signals, said parameter indicative of a condition of the machine;
    a voting module positioned within the housing and configured to receive the respective output signals and generate a corrected output based on the respective output signals;
    a memory device positioned within the housing and comprising a store location configured to store manual input functions relating to a construction of the machine;
    a life calculator positioned within the housing and communicatively coupled to said voting module and said memory device, said life calculator configured to determine a life remaining in said machine using the corrected output and the manual input functions; and
    a display positioned within the housing and configured to display the life remaining in the machine.

2. A system in accordance with claim 1, wherein the condition of the machine is relatable to a life remaining in the machine.

3. A system in accordance with claim 1, wherein the plurality of sensors are configured to monitor a temperature of the machine.

4. A system in accordance with claim 1, wherein the plurality of sensors are spaced circumferentially approximately one hundred twenty degrees apart.

5. A system in accordance with claim 1, wherein the manual input functions relating to a construction of the machine comprise at least one of a winding insulation type and a cooling type.

6. A system in accordance with claim 1, wherein said life calculator is configured to determine a percentile value for the generated respective output signals.

7. A system in accordance with claim 1, wherein said life calculator is configured to determine a percentile value for an average of the generated respective output signals over a predetermined time.

8. A system in accordance with claim 1, wherein said life calculator is configured to determine a remaining life output using a percentile value for an average of the generated respective output signals over a predetermined time.

9. A system in accordance with claim 1, wherein said life calculator is configured to determine the parameter exceeds a predetermined threshold range and generate an output indicative of the exceedance.

10. A system in accordance with claim 1, wherein said life calculator comprises a processor and said life calculator is configured to store calculated outputs onboard for at least one of a future output off board said system and a display onboard the system.

11. A system in accordance with claim 1, further comprising an output connection positioned within the housing and communicatively coupled to said memory device.

12. A method of monitoring a condition of a machine, said method comprising:
    receiving a plurality of sensor outputs at a machine condition monitoring device mounted on the machine being monitored, the sensor outputs related to parameters of the machine that are relatable to a life of at least one component of the machine;
    generating a plurality of corrected outputs via a voting module, wherein the corrected outputs are based on the received sensor outputs;
    receiving from a stored location in the machine condition monitoring device input functions that have been manually stored in the stored location, the input functions relating to a construction of the machine;
    periodically determining a life left in the machine using the generated corrected outputs and the received input functions by a life calculator coupled to the voting module and positioned within the machine condition monitoring device; and
    displaying on the machine condition monitoring device an amount of the determined life left in the machine.

13. A method in accordance with claim 12 wherein periodically determining a life left in the machine comprises periodically determining a life left in the machine using samples of the received plurality of sensor outputs associated with a predetermined percentile.

14. A method in accordance with claim 12 wherein periodically determining a life left in the machine comprises periodically determining a life left in the machine using samples of the received plurality of sensor outputs associated with a plurality of predetermined percentiles.

15. A method in accordance with claim 12 wherein receiving a plurality of sensor outputs comprises receiving a plurality of temperature sensor outputs.

16. A method in accordance with claim 12 wherein receiving a plurality of sensor outputs comprises receiving a plurality of winding temperature sensor outputs.

17. An electrical machine system comprising:
a plurality of electrical windings;
a plurality of temperature sensors positioned proximate respective ones of said electrical windings; and
a machine monitoring system coupled to said electrical machine and communicatively coupled to said temperature sensor, said machine monitoring system comprising a processor having a memory, said processor programmed to:
receive respective output signals from said plurality of temperature sensors relative to a temperature of the electrical winding;
generate a corrected output based on a selectable number of sensors determined to meet a predetermined reliability criteria;
receive information relative to a construction of the electrical machine from the memory;
determine a remaining life of the machine using the received signal and the received information; and
display the remaining life on the machine monitoring system.

18. A system in accordance with claim 17, wherein the information relative to a construction of the electrical machine comprises at least one of a winding insulation type, a winding insulation material, a winding insulation rating, and a machine cooling system type.

19. A system in accordance with claim 17, wherein said processor is programmed to determine the remaining life using a predetermined percentile of a plurality of samples of the received signals.

* * * * *